Feb. 17, 1931.   K. HERRMANN   1,793,400
ANIMAL DOLL
Filed Dec. 23, 1929
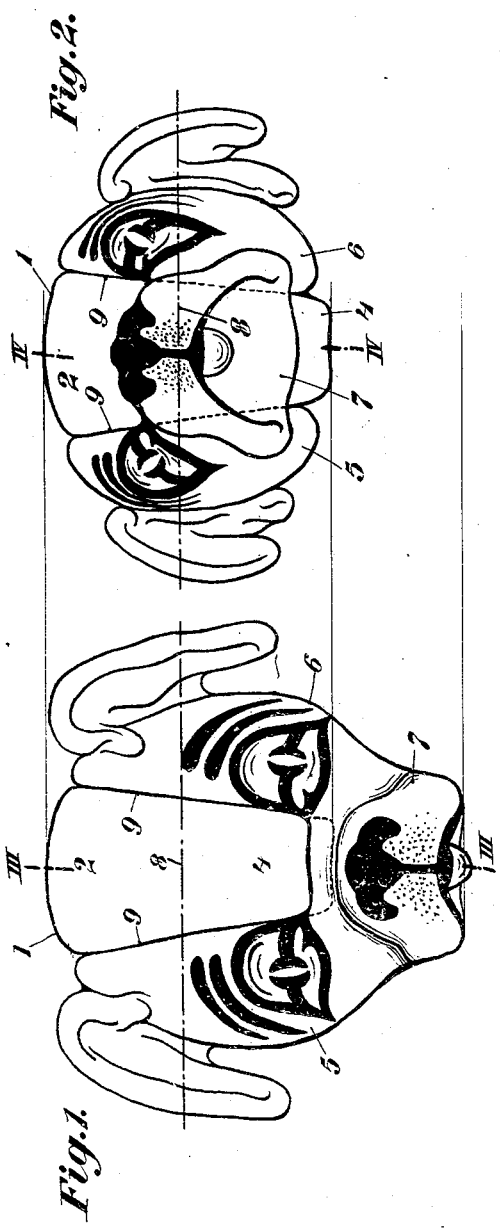
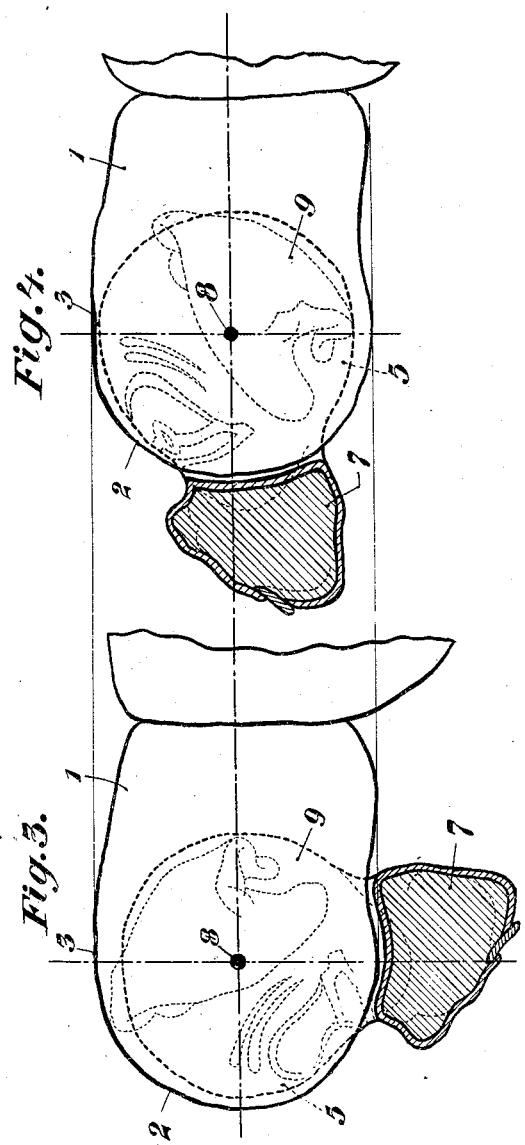
INVENTOR
Karl Herrmann,
BY
ATTORNEY Patented Feb. 17, 1931

1,793,400

UNITED STATES PATENT OFFICE

KARL HERRMANN, OF GEHREN, GERMANY

ANIMAL DOLL

Application filed December 23, 1929, Serial No. 416,054, and in Germany December 29, 1928.

This invention relates to dolls, particularly to dolls which simulate animals and the like. According to the invention the head is composed essentially of a forehead or cranium part and of a part surrounding the forehead part at the sides and at the bottom of the latter and representing the two halves of the face including the ears, eyes and also the jaw, said parts being relatively adjustable on an axis passing through the center of the head.

It is quite old in the art to so mount the head of an animal doll relatively to the body that the head may be moved upwardly or downwardly or to either side. It is also old in the art to so mount the front and rear legs of animal figures on the body that they may assume any desired inclined position such as a sitting, standing, jumping or running posture or the like.

In order to impart to such a doll the expressions characteristic of the different positions of the body for each of such positions, the eye-ear-and chin-parts of the animal figure are, according to the invention, mounted so that they may oscillate in relation to the forehead part.

It will be clear that by oscillating said parts the facial expression of the animal doll will be entirely changed. If for example the eye, ear and chin parts are moved upwards relative to the forehead part, not only will the forehead of the animal be lower but the whole head will be shorter and more compact, because the jaws which were directed downwardly before the lifting of the oscillating part assume a horizontal position after the lifting. The height of the head is therefore reduced by the length of the jaws. But since the jaws, after the lifting of the oscillating part, will project towards the front, the entire facial expression of the animal doll will be completely changed.

According to a further feature of the invention the lateral halves of the oscillatable part move on guides of the central part, forming an acute angle in direction of the top of the skull. Consequently when lifting up, the upper halves of the preferably yielding oscillating part move slightly apart, and the forehead, which was previously long and narrow, appears short and also wide through the tipping up movement.

In this manner an animal doll is produced, which forms a very entertaining and at the same time instructive toy and which enables the setting of the most varied facial expressions and postures.

An embodiment of the invention is illustrated, by way of example in the accompanying drawing in which:

Fig. 1 is a front elevation with lowered oscillatable part.

Fig. 2 is a front elevation with raised oscillatable part.

Fig. 3 is a vertical section on line III—III of Fig. 1.

Fig. 4 is a vertical section on line IV—IV of Fig. 2.

The head 1 of the animal figure is rotatable or oscillatable as a whole on the trunk (not shown) of the animal figure. The head is composed of a centre part 4, preferably forming the forehead 2 and the skull 3, and of two side portions 5 and 6 which are connected by the jaw 7. The side portions 5 and 6 and jaw 7 are rotatable relatively to the centre part 4 on a shaft 8 which extends through the latter approximately midway between its front and rear faces. The sides of the centre part 4 converge toward its lower end and the inner side walls of the side portions converge to substantially the same degree toward the jaw 7 as at 9 so that the side portions 5 and 6 are guided in their movement relatively to the centre portion 4. When the parts 5, 6 and 7 are moved upwardly relatively to the centre part 4, the forehead of the animal figure is first made smaller. As moreover the upper ends of the lateral halves are pressed slightly apart at 9, 9, the forehead, which previously appeared long and narrow, now appears short and wide. As the jaws are moved from their downwardly projecting position shown in Figures 1 and 3 into the horizontal position shown in Figures 2 and 4, the whole head appears to be correspondingly shortened. Consequently the head of the animal doll has an entirely different appearance when viewed in full face.

The profile of the head also alters, when the parts 5, 6 and 7 are moved upwardly. First the jaws are moved from their vertical position into the horizontal position, so that they project far towards the front. Secondly the height of the head is reduced by the length of the jaws and thirdly the forehead appears correspondingly smaller.

Preferably the position of the oscillatable part is made to suit the pose of the animal and, for example when in the running position, the oscillatable part is lifted more or less and the oscillatable part is lowered for resting or sitting postures.

The invention is particularly adapted for use in soft stuffed animal figures, doll figures and the like. It can however also be used for animal dolls with a rigid covering and of any form of construction.

I claim:

1. A doll head simulative of the head of an animal comprising a central part of greater height than its width and formed to resemble the forehead and skull of an animal, and a part straddling said central part from below the latter and representing opposite side portions and lower portion of the head of the animal, the latter part being mounted on the first-named part to swing relatively to the latter on an axis approximately midway between the front and back of the second-named portion.

2. A doll head according to claim 1 wherein the side faces of the central part diverge toward the skull and the side faces of the other part which are directed toward the side faces of said central part diverge in the same direction and to substantially the same degree as the latter.

In testimony whereof I affix my signature.

KARL HERRMANN.